June 26, 1923.

F. E. JOHNSON, JR 1,459,913

DIGESTER AND STRAINER THEREFOR

Filed June 1, 1921

Inventor
F. E. Johnson Jr.
By his Attorneys
Sheffield & Betts

Patented June 26, 1923.

1,459,913

UNITED STATES PATENT OFFICE.

FRANCIS E. JOHNSON, JR., OF ORANGE, NEW JERSEY, ASSIGNOR TO THE M. W. KELLOGG COMPANY, A CORPORATION OF DELAWARE.

DIGESTER AND STRAINER THEREFOR.

Application filed June 1, 1921. Serial No. 474,245.

*To all whom it may concern:*

Be it known that I, FRANCIS E. JOHNSON, Jr., a citizen of the United States, and resident of Orange, New Jersey, have invented certain new and useful Improvements in Digesters and Strainers Therefor, of which the following is a disclosure.

My invention relates to the art of suspending strainers in digesters and like apparatus. Prior to my invention, it has been customary in the design of digesters for sulphate and like processes to employ large strainers within the digester tanks, said strainers being of a funnel shape and fixed to the bottom as well as to the upright wall of the digester tank. The expansion of the strainers and tanks under the temperature and pressure of the digesting operation being along different lines, this method of supporting the strainers has frequently caused serious permanent distortion of the same.

It is accordingly the principal object of my invention to provide an arrangement of strainer within a tank whereby the expansion or distortion of either strainer or tank or both under the influence of temperature and pressure will produce a minimum stress on the strainer.

An apparatus according to my invention is illustrated in the accompanying drawing in which—

Figure 1:
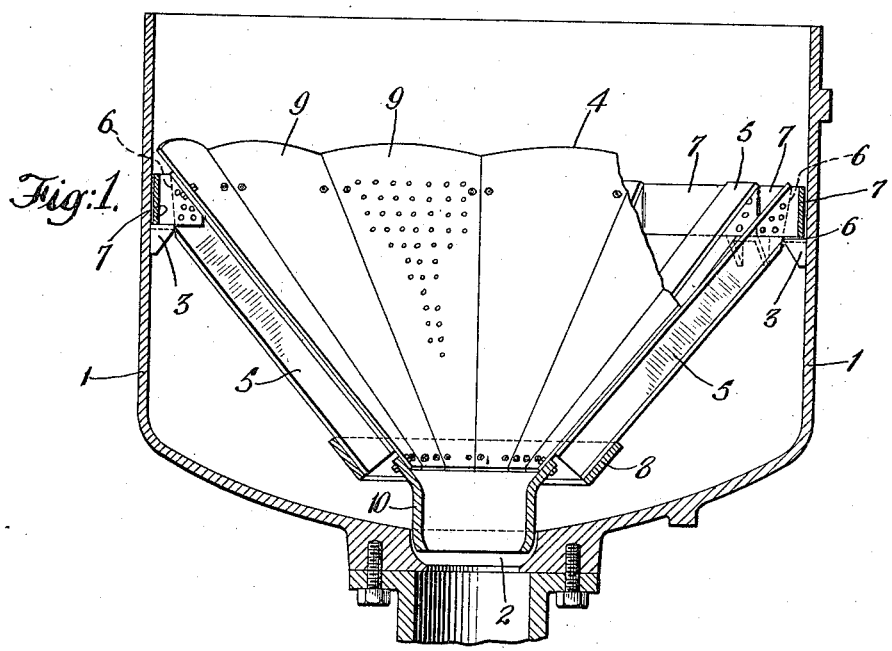
Fig. 1 is a central vertical section through a digester tank having a strainer therein.
Figure 2:
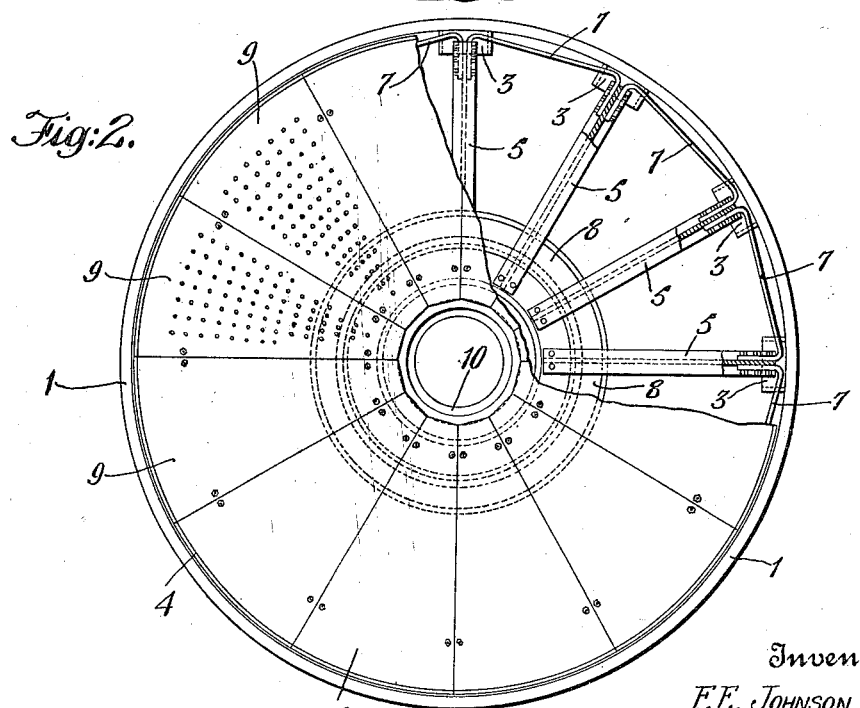
Fig. 2 is a plan view of the apparatus shown in Fig. 1, parts being broken away to better illustrate the construction.

In the drawing, 1 is a tank having an outlet at 2. According to my invention, I provide brackets 3, 3 fixed to the inside of the vertical wall of the tank 1, and hang the strainer structure from these brackets, the lower end of the strainer being entirely free from the tank and the two being capable of movement without causing mutual interference.

The strainer 4 comprises downwardly converging inclined members 5, 5 of H section, the upper ends of which are beveled off as indicated at 6, but which project over and rest on the brackets 3. Members 5 are connected at their upper ends by straps 7, 7 the straps 7 also resting on the brackets 3. At their lower ends, members 5 are fixed to a heavy steel band 8 of frustro-conical shape, band 8 fitting against the lower sides of members 5 and binding them into a rigid structure. On their upper sides, members 5 carry perforated strainer plates 9, 9. While only a few plates 9 are illustrated as perforated, it will be understood that they are all so. Strainer plates 9 project beyond their supporting members 5 at both ends. At their lower ends, plates 9 have bolted thereto a discharge funnel or mouth 10 which projects into the outlet 2 of tank 1, and can move freely in said outlet as the strainer expands, contracts or bends under the influence of temperature and pressure.

The conical or funnel shaped strainer 4, according to my invention, being suspended within tank 1, so as to be entirely free therefrom, except at one end, there is no danger of its buckling owing to its normal expansions and contractions in use. Moreover, I have provided a strainer structure well adapted to support the stresses met with in digester practice and which is adapted also for suspension from the most convenient point,—its upper edge.

Having thus described my invention, I claim:

1. A digester apparatus comprising a tank and a strainer therein supported at one end only.

2. A digester apparatus comprising a tank and a conical strainer therein having its smaller end downward and supported only at its upper end.

3. A digester apparatus comprising a tank having a vertical side wall and having brackets around the inner face of said wall, and a conical strainer supported solely from said brackets.

4. A digester apparatus comprising in combination a tank and a strainer therein having an upper and a lower end, said strainer supported near its upper end solely from the wall of said tank, the lower end of said strainer being free to move both up and down with respect to the bottom of said tank sufficiently to prevent buckling from changes of pressure and temperature during normal operation.

FRANCIS E. JOHNSON, JR.